United States Patent
Chen et al.

(10) Patent No.: US 9,572,174 B2
(45) Date of Patent: Feb. 14, 2017

(54) METHOD FOR SCHEDULING RADIO ACTIVITIES FOR MULTIPLE RAT MODULES SHARING ONE ANTENNA IN A COMMUNICATIONS APPARATUS AND COMMUNICATIONS APPARATUSES UTILIZING THE SAME

(75) Inventors: Hung-Yueh Chen, Taipei (TW); Jui-Ping Lien, Taipei (TW); Chia-Yi Huang, Taichung (TW)

(73) Assignee: MEDIATEK INC., Hsin-Chu (TW)

(*) Notice: Subject to any disclaimer, the term of this patent is extended or adjusted under 35 U.S.C. 154(b) by 685 days.

(21) Appl. No.: 13/240,875

(22) Filed: Sep. 22, 2011

(65) Prior Publication Data
US 2013/0079025 A1    Mar. 28, 2013

(51) Int. Cl.
| | |
|---|---|
| H04W 72/04 | (2009.01) |
| H04W 24/10 | (2009.01) |
| H04W 72/12 | (2009.01) |
| H04W 88/06 | (2009.01) |
| H04W 76/02 | (2009.01) |
| H04W 48/12 | (2009.01) |

(52) U.S. Cl.
CPC ......... H04W 72/1215 (2013.01); H04W 48/12 (2013.01); H04W 76/025 (2013.01); H04W 88/06 (2013.01)

(58) Field of Classification Search
CPC .... H04W 72/04; H04W 88/06; H04W 88/022; H04W 88/023
See application file for complete search history.

(56) References Cited

U.S. PATENT DOCUMENTS

| | | | | |
|---|---|---|---|---|
| 7,626,956 | B2* | 12/2009 | Palenius | H04W 36/0088 370/310 |
| 2003/0152044 | A1 | 8/2003 | Turner | |
| 2006/0013176 | A1* | 1/2006 | De Vos | H04W 36/14 370/338 |
| 2008/0002604 | A1* | 1/2008 | Wilborn | H04W 36/0088 370/320 |

(Continued)

FOREIGN PATENT DOCUMENTS

| | | |
|---|---|---|
| CN | 1568072 | 1/2005 |
| CN | 1774946 | 5/2006 |
| CN | 101420786 | 4/2009 |

OTHER PUBLICATIONS

English language machine translation of CN 1568072 (published Jan. 19, 2005).

*Primary Examiner* — Vladimir Magloire
*Assistant Examiner* — Frank Donado
(74) *Attorney, Agent, or Firm* — McClure, Qualey & Rodack, LLP

(57) ABSTRACT

A communication apparatus is provided. A processor is coupled to a first radio access technology (RAT) module, a second RAT module and a radio transceiver shared by the first and second RAT modules. The first RAT module camps on a first serving cell belonging to a first wireless network and is in a packet transfer mode to perform data transfer in the first wireless network via the radio transceiver. The second RAT module camps on a second serving cell belonging to a second wireless network. The processor schedules the second RAT module to receive at least one neighbor cell's information in a portion of a plurality of predetermined frames during the data transfer of the first RAT module via the radio transceiver.

15 Claims, 9 Drawing Sheets

(56) References Cited

U.S. PATENT DOCUMENTS

| | | | |
|---|---|---|---|
| 2010/0142487 A1* | 6/2010 | Kim | H04W 24/10 370/332 |
| 2010/0142491 A1* | 6/2010 | Dubreuille | H04L 1/0083 370/336 |
| 2011/0207453 A1* | 8/2011 | Hsu | H04W 88/06 455/424 |
| 2012/0040670 A1* | 2/2012 | Chin | H04W 60/005 455/435.1 |
| 2012/0250737 A1* | 10/2012 | Thoukydides | H04W 72/1215 375/219 |
| 2012/0314589 A1* | 12/2012 | Chen | H04W 24/10 370/252 |
| 2013/0010656 A1* | 1/2013 | Chin et al. | 370/280 |
| 2013/0053076 A1* | 2/2013 | Chang et al. | 455/509 |
| 2013/0295978 A1* | 11/2013 | Ruohonen | H04W 72/1215 455/509 |

\* cited by examiner

METHOD FOR SCHEDULING RADIO ACTIVITIES FOR MULTIPLE RAT MODULES SHARING ONE ANTENNA IN A COMMUNICATIONS APPARATUS AND COMMUNICATIONS APPARATUSES UTILIZING THE SAME

BACKGROUND OF THE INVENTION

Field of the Invention

The invention relates to a method for scheduling radio activities for multiple radio access technology (RAT) modules in a communications apparatus, and more particularly to a method for scheduling radio activities for multiple RAT modules sharing one antenna in a communications apparatus.

Description of the Related Art

The term "wireless", normally refers to an electrical or electronic operation, which is accomplished without the use of a "hard wired" connection. "Wireless communications", is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and well-defined cellular communications technologies. For example, the Global System for Mobile communications (GSM) is a well-defined and commonly adopted communications system, which uses time division multiple access (TDMA) technology, which is a multiplex access scheme for digital radio, to send voice, data, and signaling data (such as a dialed telephone number) between mobile phones and cell sites.

BRIEF SUMMARY OF THE INVENTION

Communication apparatuses and methods for scheduling radio activities for at least a first radio access technology (RAT) module and a second RAT module configured in a communications apparatus and sharing a radio transceiver are provided. An embodiment of a communication apparatus comprises a processor coupled to a first RAT module, a second RAT module and a radio transceiver shared by the first and second RAT modules. The first RAT module camps on a first serving cell belonging to a first wireless network and is in a packet transfer mode to perform data transfer in the first wireless network via the radio transceiver. The second RAT module camps on a second serving cell belonging to a second wireless network. The processor schedules the second RAT module to receive at least one neighbor cell's information in a portion of a plurality of predetermined frames during the data transfer of the first RAT module via the radio transceiver.

An embodiment of a method for scheduling radio activities for at least a first RAT module and a second RAT module configured in a communications apparatus and sharing a radio transceiver is provided, wherein the first RAT module camps on a first cell belonging to a first wireless network and is in a packet transfer mode to perform data transfer in the first wireless network via the radio transceiver and the second RAT module camps on a second cell belonging to a second wireless network, and the method comprises: directing the first RAT module not to receive at least one neighbor cell's information in a portion of a plurality of predetermined frames during the data transfer, wherein in the predetermined frames, the first RAT module is expected to receive the neighbor cell's information via the radio transceiver; and directing the second RAT module to receive at least one neighbor cell's information thereof in the portion of the predetermined frames via the radio transceiver.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

With advancements in communications techniques, mobile stations (MS, which may be interchangeably referred to as user equipments (UE)) are now capable of handling multiple radio access technologies (RAT), such as at least two of GSM/GPRS/EDGE (Global System for Mobile Communications/General Packet Radio Service/Enhanced Data rates for Global Evolution) RATs, or the similar via one communications apparatus.

Figure 1:
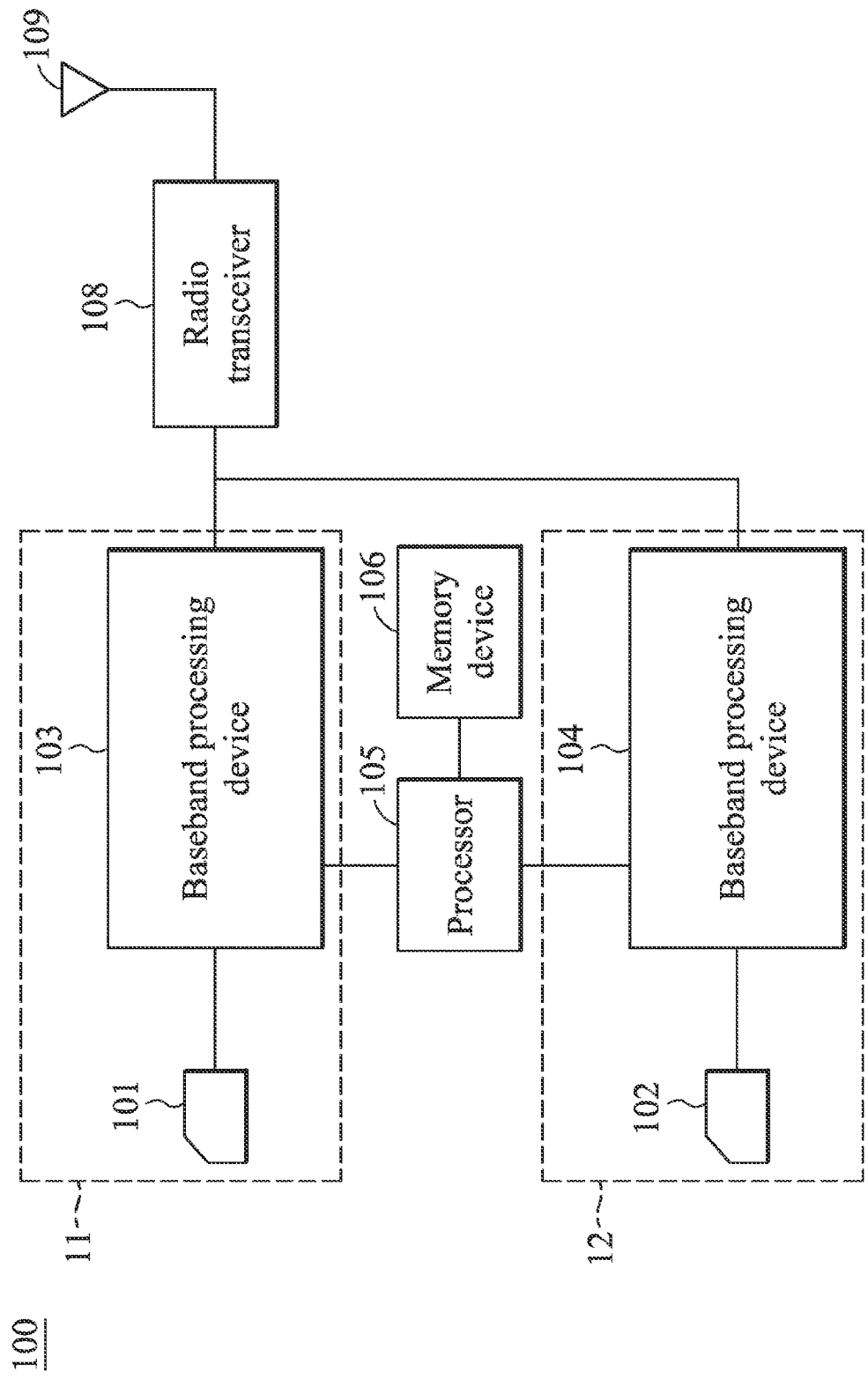
FIG. 1 shows a communications apparatus equipped with two RAT modules according to an embodiment of the invention.

FIG. 1 shows a communications apparatus equipped with two RAT modules according to an embodiment of the invention. The communications apparatus 100 may comprise two RAT modules 11 and 12 (which may be different RATs or the same RAT, and the invention should not be limited to either cases), a processor 150 coupled to the RAT modules 11 and 12, a memory device 106, and a radio transceiver 108 and an antenna 109 shared by the RAT modules 11 and 12. The RAT module 11 may at least comprise a subscriber identity card 101 and a baseband processing device 103, and the RAT module 12 may at least comprise a subscriber identity card 102 and a baseband processing device 104.

The radio transceiver 108 may receive wireless radio frequency signals, convert the received signals to baseband signals to be processed by the baseband processing device 103 and/or 104, or receive baseband signals from the baseband processing device 103 and/or 104 and convert the received signals to wireless radio frequency signals to be transmitted to a peer device. The radio transceiver 108 may comprise a plurality of hardware devices to perform radio frequency conversion. For example, the radio transceiver 108 may comprise a mixer to multiply the baseband signals with a carrier oscillated in the radio frequency of the wireless communication system, wherein the radio frequency may be, for example, 900 MHz or 1800 MHz for a global system for mobile communication (GSM), or others. The baseband processing devices 103 and 104 may further convert the baseband signals to a plurality of digital signals, and process the digital signals, and vice versa. The baseband processing devices 103 and 104 may also comprise a plurality of hardware devices to perform baseband signal processing. The baseband signal processing may comprise analog to digital conversion (ADC)/digital to analog conversion (DAC), gain adjustments, modulation/demodulation, encoding/decoding, and so on. The processor 105 may control the operations of the radio transceiver 108 and the RAT modules 11 and 12, respectively. The processor 105 may read data from the plugged in subscriber identity cards 101 and 102 and write data to the plugged in subscriber identity cards 101 and 102

According to an embodiment of the invention, the processor 105 may be arranged to execute the program codes of the corresponding software module of the RAT modules 11 and 12. The processor 105 may maintain and execute the individual tasks, threads, and/or protocol stacks for the RAT modules 11 and 12, so as to independently control the operations of the baseband processing devices 103 and 104, the radio transceiver 108, and the subscriber identity cards 101 and 102 plugged into two sockets, respectively. In the preferred embodiments, two protocol stacks may be implemented so as to respectively handle the radio activities of the individual RAT module. However, it is also possible to implement only one protocol stack to handle the radio activities of the RAT module at the same time, and the invention should not be limited thereto. Note also that in other embodiments of the invention, the communications apparatus may also be designed to have dual processors. As the communications apparatus 100' shows in FIG. 2, the processors and memory devices may be integrated in Baseband processing devices 103' and 104' of the RAT modules 11' and 12', respectively, and each processor may maintain and execute the task(s), thread(s), and/or protocol stack(s) for the corresponding RAT module 11' or 12'. Therefore, the invention should not be limited to either case.

Figure 2:
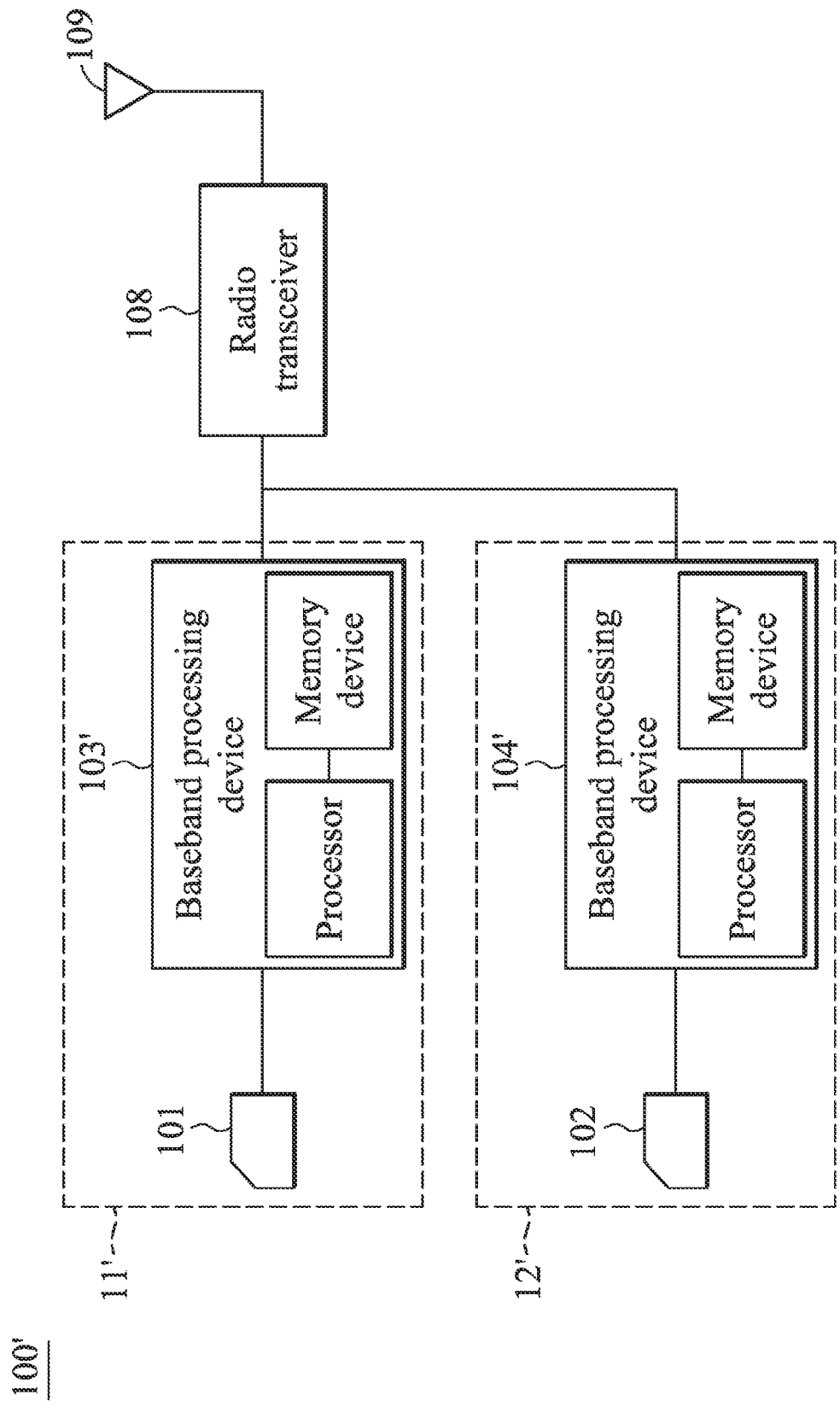
FIG. 2 shows a communications apparatus equipped with two different RAT modules according to another embodiment of the invention.
Figure 3:
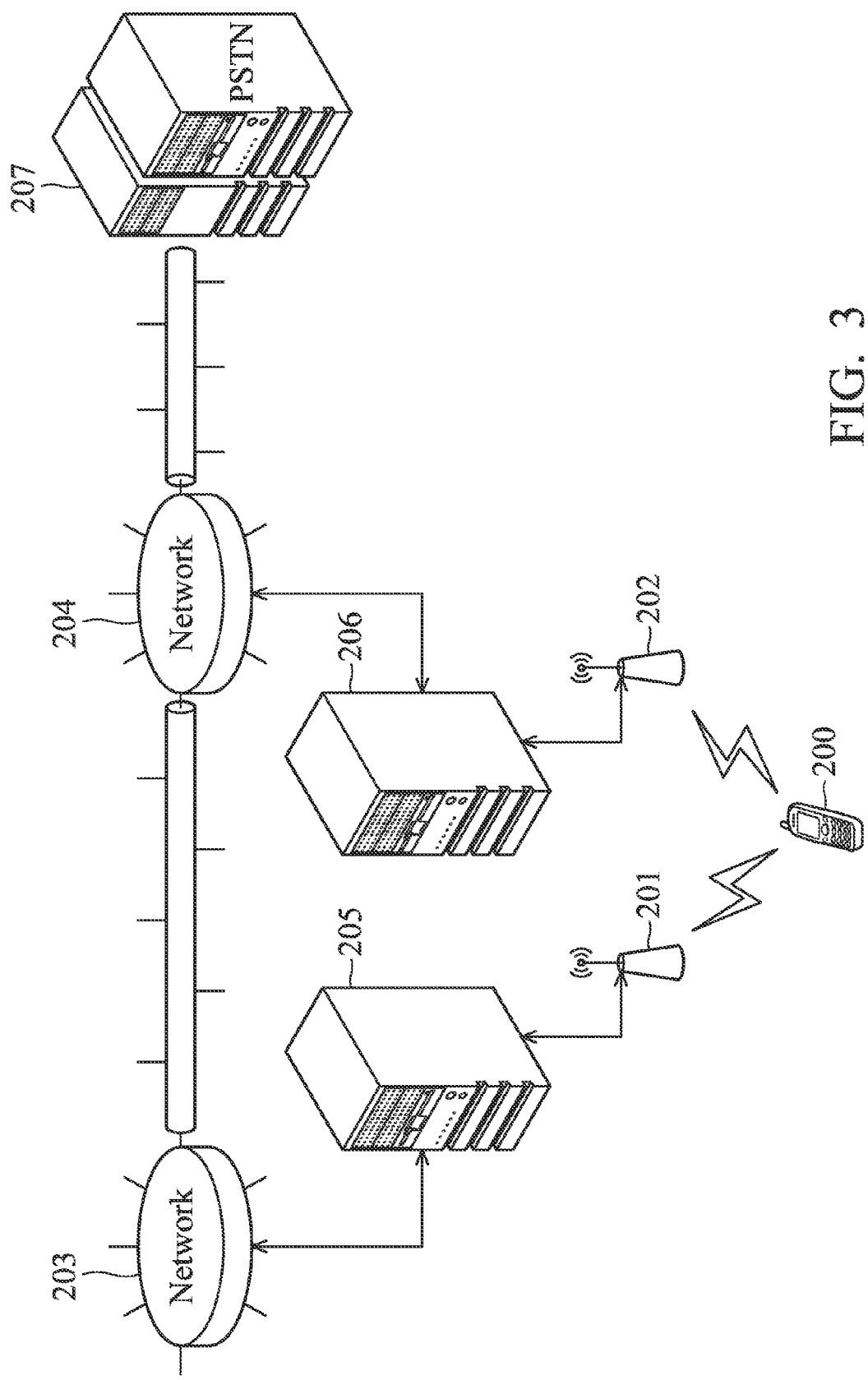
FIG. 3 shows an exemplary network topology according to an embodiment of the invention.

FIG. 3 shows an exemplary network topology according to an embodiment of the invention. The communications apparatus 200 shown in FIG. 3 may be the communications apparatuses 100 and 100' previously described in FIG. 1 and FIG. 2. Thus, from hereinafter, the communications apparatus 200 will be used to represent all like previously described apparatuses for brevity. The communications apparatus 200, equipped with more than one subscriber identity card, may simultaneously access more than one network 203 and 204 of the same or different RATs, where the network 203 or 204 may be the GSM network, the Internet, or the like, after camping on or associating with the cells managed by the access stations 201 and 202, where the access station 201 or 202 may be a base station, a node-B, or an access point compatible with 802.1a, 802.1b or 802.1g. The communications apparatus 200 may issue an apparatus originated communication request, such as a voice call, a data call, a video call, or a voice over Internet Protocol (VOIP) call, to a called party (i.e. the corresponding peer of another wired or wireless communication apparatus) through at least one of the networks 203 and 204 with corresponding intermediary apparatuses 205 and 206 (for example, the GSM network with a Mobile Switching Center (MSC), or the Internet with a Session Initiation Protocol (SIP) server), or through the Public Switched Telephone Network (PSTN) 207 or any combinations thereof, by using any of the equipped subscriber identity cards. Moreover, the communications apparatus 200 may receive an apparatus terminated communication request, also referred to as mobile terminated (MT) call request, such as an incoming phone call, with any of the subscriber identity cards from a calling party. It is to be understood that there may be one or more gateways positioned between heterogeneous types of networks.

According to an embodiment of the invention, because the radio resources (for example, including at least the radio transceiver 108 and antenna 109) are shared by the RAT modules 11 and 12 (or the RAT modules 11' and 12' as show in FIG. 2), an arbiter is introduced to schedule and coordinate radio activities of different RAT modules. The radio activity may be, for example but not limited to, a channel activity for transmitting or receiving information to or from the corresponding cell, or a measurement activity for performing a power scan or frequency scan of a serving cell or neighbor cell, or others. In some embodiments of the invention, a real time base (RTB) software module may be designed to play a role for scheduling and coordinating the radio activities. When the RTB software module is executed by the processor 105 as shown in FIG. 1 or by the processors as shown in FIG. 2, it may become an apparatus, such as an arbiter to schedule and coordinate the radio activities of different RAT modules. Note that in other embodiments, the arbiter may also be designed and implemented as a dedicated hardware device, and the invention should not be limited thereto. For simplicity, the term "processor" is used as a subject term to represent the arbiter in the following paragraphs so as to clearly describe the operations thereof.

As is well known, a GSM network uses a combination of frequency division multiple access (FDMA), whereby an available frequency spectrum is divided into separate frequency carriers, and time division multiple access (TDMA), typically having eight time slots per frame, to share available frequency spectrum resources among all users. To schedule the timing of traffic and control transmissions (also called the "bursts"), each group of eight time slots forms a frame, and frames are grouped together to form multiframes. There are two basic types of multiframe structures which are used in GSM, including the 26 and 51 frames. The 26 frame multiframe structure (so called "26 multiframe") primarily contains voice or data traffic channels and the 51 frame multiframe structure (so called "51 multiframe") is used for control channels, including broadcast control channels that are used for base station identification and frequency allocations and common control channels that are used during call origination and call paging. The 26 multiframe uses different frequencies than the 51 multiframe. In this way, all time slots on a given frequency have the same type of frame/multiframe structure.

According to an embodiment of the invention, one RAT module (hereinafter called the RAT 1) configured in the communications apparatus 200 camps on a first serving cell belonging to a first wireless network (i.e. the service network) and enters a packet transfer mode (PTM) to construct a packet switch (PS) connection with the first wireless network and perform data transfer in the first wireless network via the radio transceiver 108 and the antenna 109. Meanwhile, another RAT module (hereinafter called the RAT 2) configured in the communications apparatus 200 camps on a second serving cell belonging to a second wireless network and enters an idle mode for normal standby. Note that in the conventional design, for the case when a communications apparatus is equipped with two RAT modules, one RAT module may enter a "suspend mode" to suspend its transmitting and receiving functions when the radio resources are occupied by another RAT module to perform CS voice or PS data transfer.

However, based on the concept of the invention, in order to provide more efficient and reliable radio services, one or more gap intervals may be provided during the data transfer of the RAT module RAT1 for the RAT module RAT 2 to perform the corresponding radio activities. Therefore, in the embodiments of the invention, even if the RAT module RAT 1 enters the PTM for data transfer, the RAT module RAT 2 may still stay in the idle mode (or called a "virtual idle mode" to distinguish from the idle mode in the conventional one RAT in a communications apparatus's design) for normal standby.

Figure 4:
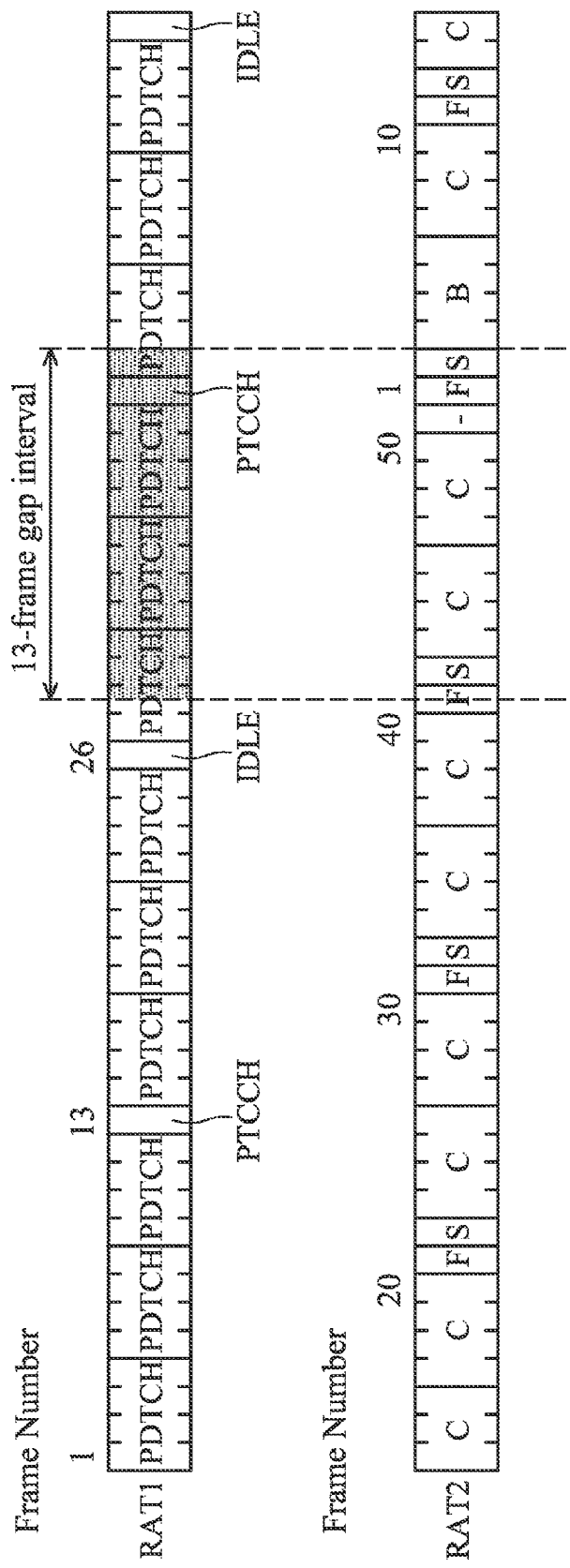
FIG. 4 shows the frame structures of the RAT modules RAT 1 and RAT 2 according to an embodiment of the invention.

FIG. 4 shows the frame structures of the RAT modules RAT 1 and RAT 2 according to an embodiment of the invention. As previously described, as the RAT module RAT 1 enters the PTM for data transfer, the 26 frame multiframe structure is adopted by the RAT module RAT 1. On the other hand, as the RAT module RAT 2 may still stay in the idle mode (or called the "virtual idle mode") for normal standby, the 51 frame multiframe structure is adopted by the RAT module RAT 2. In the 26 frame multiframe structure shown in FIG. 4, the packet data traffic channel (PDTCH) is arranged in most of the frames for data transfer, where 4 PDTCH frames forms a packet data blocks. In the 51 frame multiframe structure shown in FIG. 4, the signaling channels F, S, C and B are arranged in a predefined order.

The F represents the frequency correction channel (FCCH), which carries information regarding the carrier frequency utilized by the base station (which may be the base station associating with either the serving cell or the neighbor cell). After receiving the FCCH burst, the corresponding RAT module in the communications apparatus may synchronize with the base station in frequency, and further obtain information regarding the frame boundary and the frame structure corresponding to the base station. The S represents the synchronization channel (SCH), which carries information regarding the Base Station Identity Code (BSIC) associated with the base station and the Reduced Frame Number (RFN) of the current TDMA frame of the base station. Therefore, after receiving the SCH burst, the corresponding RAT module in the communications apparatus may obtain information of the frame timing corresponding to the base station and synchronize with the base station in time. The B represents the broadcast control channel (BCCH), which carries radio link configurations information and synchronization information associated with the base station. After receiving the BCCH burst, the corresponding RAT module in the communications apparatus may obtain system information of the base station. The C represents the common control channel (CCCH), where the random access channel (RACH) burst, access grant channel (AGCH) burst, paging channel (PCH) burst and notification channel (NCH) burst may be transmitted in the TDMA frames of the CCCH.

As shown in FIG. 4, according to the embodiments of the invention, one or more gap intervals may be provided during the data transfer of the RAT module RAT 1 for the RAT module RAT 2 to obtain information regarding at least one neighbor cell thereof, so that the RAT module RAT 2 may still monitor the neighbor cell's condition just like normal standby. During the gap intervals, the data transfer of the RAT module RAT 1 is suspended, and the RAT module RAT 2 is allowed to use the radio resources for performing the corresponding radio activities and the RAT module RAT 1 is not allowed to use the radio resources for performing the corresponding radio activities. According to an embodiment of the invention, the neighbor cell's information may be a frequency correction channel (FCCH) burst or a synchronization channel (SCH) burst. As the embodiment shows in FIG. 4, the RAT module RAT 2 plans to decode the BSIC associated with its neighbor cell carried in the SCH. In a better case, when the frame structure and/or the frame timing of the neighbor cell of the second RAT module is known, only a 1-frame gap interval has to be provided for the RAT module RAT 2 to receive the SCH burst for BSIC decoding. Therefore, in the better case, the data transfer of the RAT module RAT 1 may be suspended for only 1 or 2 packet data blocks.

However, in a worse case, when the frame structure and/or the frame timing of the neighbor cell of the second RAT module is unknown, because the RAT module RAT 2 has to receive at least both of the FCCH burst and SCH burst before obtaining the BSIC, if the gap is opened from the middle of a FCCH, a 13-frame (or even more) gap interval may have to be provided for the RAT module RAT 2 until a complete FCCH burst and a SCH burst can be received. Therefore, in the worse case, the data transfer of the RAT module RAT 1 may be suspended for 3 or 4 or even more packet data blocks, causing a serious downgrade in the data transfer throughput of the RAT module RAT 1. To improve this drawback, an improved method for scheduling radio activities for multiple RAT modules sharing one antenna in a communications apparatus without degrading the throughput of the data transfer of the RAT module RAT 1 will be provided in the following paragraphs.

According to an embodiment of the invention, during the data transfer of the RAT module RAT 1, the processor may grant and schedule the RAT module RAT 2 to use the radio resources (for example, including at least the radio transceiver 108 and antenna 109) to receive at least one neighbor cell's information in a portion of a plurality of predetermined frames. The predetermined frames may be the idle frames in the 26 multiframes (such as the IDLE frame in the 26-th frame of the 26 multiframe shown in FIG. 4) adopted by the RAT module RAT 1 for data transfer. Originally, in the packet transfer mode, the RAT module RAT 1 is expected to use the idle frames to collect the corresponding neighbor cell's information. However, based on the concept of the invention, several idle frames of the RAT module RAT 1 may be provided as the gap intervals for the RAT module RAT2 to receive the neighbor cell's information thereof. In other words, the receiving of the neighbor cell's information of the RAT module RAT 1 during the packet transfer mode is sacrificed for the RAT module RAT2 to receive the neighbor cell's information thereof. Because the gap interval is provided during the idle frame, the data transfer of the RAT module RAT 1 will not be affected. Therefore, even if one or more gap intervals are provided, the data transfer throughput of the RAT module RAT 1 will not be degraded.

Figure 5:
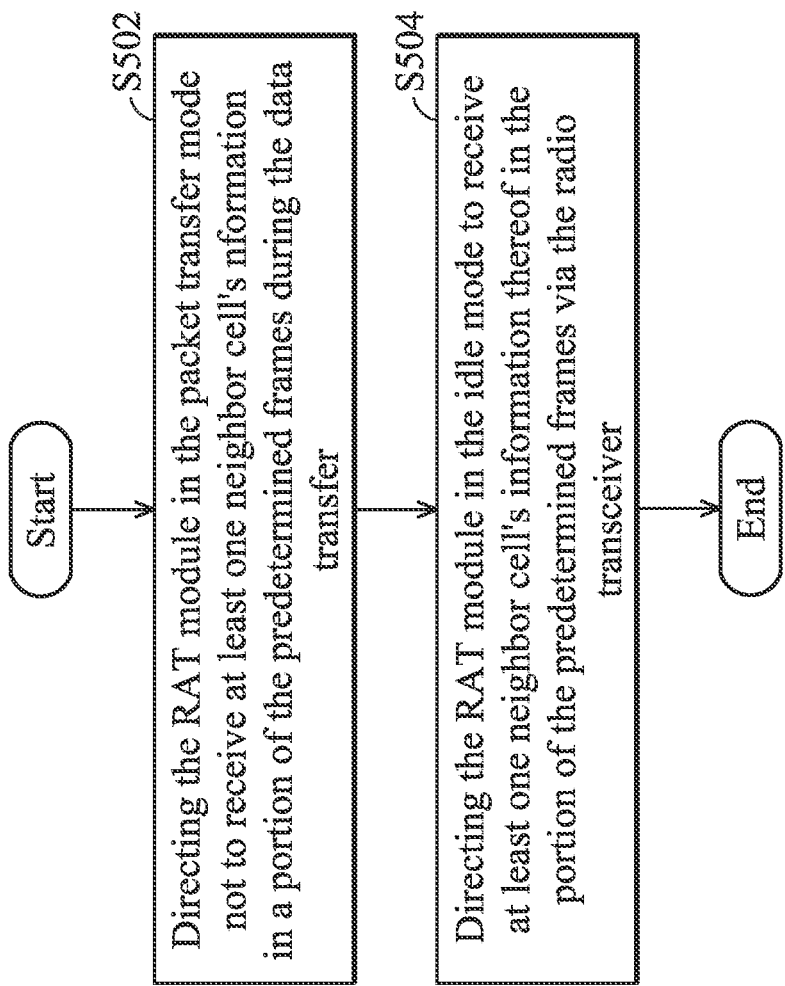
FIG. 5 is a flow chart of a method for scheduling radio activities for multiple RAT modules sharing one antenna in a communications apparatus without degrading the data transfer throughput according to an embodiment of the invention.

FIG. 5 is a flow chart of a method for scheduling radio activities for multiple RAT modules sharing one antenna in a communications apparatus without degrading the data transfer throughput according to an embodiment of the invention. Based on the concept of the invention, since one or more predetermined frames (for example, the idle frames) when performing data transfer of the RAT module in the packet transfer mode may be provided as the gap interval(s) for the RAT module in the idle mode to receive the neighbor cell's information thereof, the processor may direct the RAT module in the packet transfer mode not to receive at least one neighbor cell's information in a portion of the predetermined frames during the data transfer (Step S502). In addition, the processor may further direct the RAT module in the idle mode to receive at least one neighbor cell's information thereof in the portion of the predetermined frames via the radio transceiver (Step S504).

Figure 6:
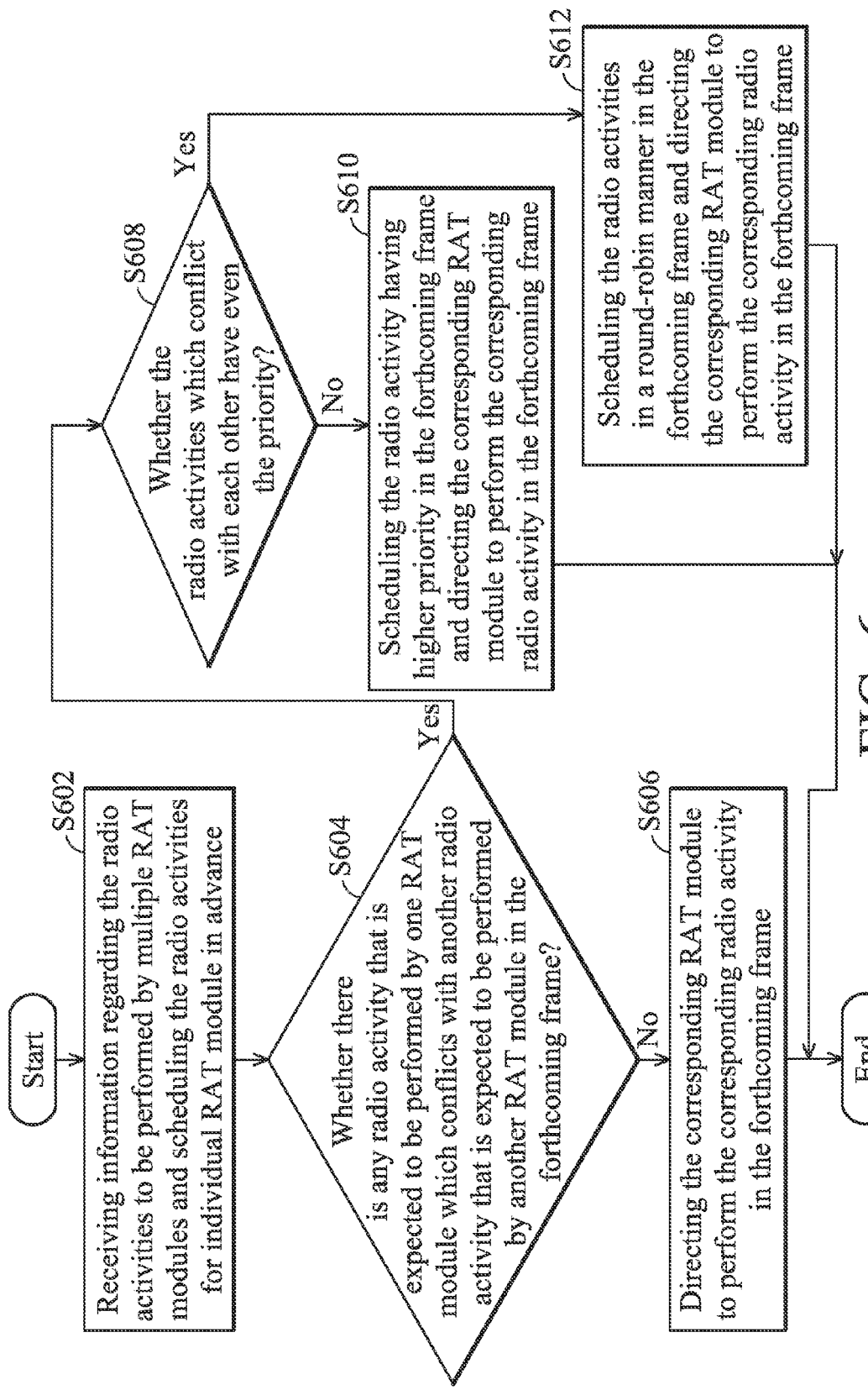
FIG. 6 is a flow chart of a method for scheduling radio activities for multiple RAT modules sharing one antenna in a communications apparatus in a coordinated manner according to an embodiment of the invention.

According to an embodiment of the invention, the processor may receive information regarding the radio activities to be performed by multiple RAT modules in advance, and determine how to schedule the radio activities according to some predetermined rules so as to provide more efficient and reliable radio services. For example, when the radio activity to be performed by one RAT module conflicts with another at the same frame time, the processor may determine which RAT module is granted to use the radio resources to perform the radio activity according to a corresponding priority. To further illustrate the concept, FIG. 6 shows a flow chart of a method for scheduling radio activities for multiple RAT modules sharing one antenna in a communications apparatus in a coordinated manner according to an embodiment of the invention.

The processor may first receive information regarding the radio activities to be performed by multiple RAT modules and schedule the radio activities for individual RAT module in advance (step S602). Next, when the time of a forthcoming frame, such as a forthcoming idle frame, is about to arrive, the processor may further determine whether there is any radio activity that is expected to be performed by one RAT module which conflicts with another radio activity that is expected to be performed by another RAT module in the forthcoming frame (Step S604). If not, the processor may direct the corresponding RAT module to perform the corresponding radio activity in the forthcoming frame (Step S606). Otherwise, the processor may further determine whether the radio activities which conflict with each other have even the priority (Step S608).

If not, the processor may schedule the radio activity having higher priority in the forthcoming frame and direct the corresponding RAT module to perform the corresponding radio activity in the forthcoming frame (Step S610). For example, when both of the RAT module (such as RAT 2) in the idle mode and the RAT module (such as RAT 1) in the packet transfer mode are expected to use the idle frame to receive the corresponding neighbor cell's information, the processor may direct the RAT module in the packet transfer mode not to receive the neighbor cell's information in the idle frame as in step S502, and direct the RAT module in the idle frame to receive the neighbor cell's information thereof in the idle frame as in step S504 when the priority of receiving the neighbor cell's information of the RAT module RAT 2 is higher than that of the RAT module RAT 1. Otherwise, if the radio activities conflicting with each other have even priority, the processor may schedule the radio activities in a round-robin manner in the forthcoming frame and direct the corresponding RAT module to perform the corresponding radio activity in the forthcoming frame (Step S612). For example, the processor may schedule the RAT modules RAT 1 and RAT 2 to receive the corresponding neighbor cell's information in the idle frames in turn.

According to an embodiment of the invention, when the portion of the idle frames is determined to be provided by the RAT module RAT 1 during data transfer as the gap interval for the RAT module RAT2 to receive the neighbor cell's information thereof, the way how to utilize the gap interval may further be differently designed depending on whether a frame structure of the neighbor cell of the RAT module RAT2 is known or unknown. In one embodiment of the invention, when the frame structure of the neighbor cell of the RAT module RAT2 is unknown, the processor may schedule all of the idle frames for the RAT module RAT 2 to receive the neighbor cell's information until a frequency correction channel (FCCH) burst of the neighbor cell is received. In another embodiment of the invention, when the frame structure of the neighbor cell of the RAT module RAT 2 is already known and the RAT module RAT 2 would like to receive the neighbor cell's information for BSIC decoding, the processor may schedule a portion of the idle frames, just during the time when the neighbor cell of the RAT module RAT 2 plans to transmit the synchronization channel (SCH) burst, for the RAT module RAT 2 to receive the neighbor cell's information.

Figure 7A:
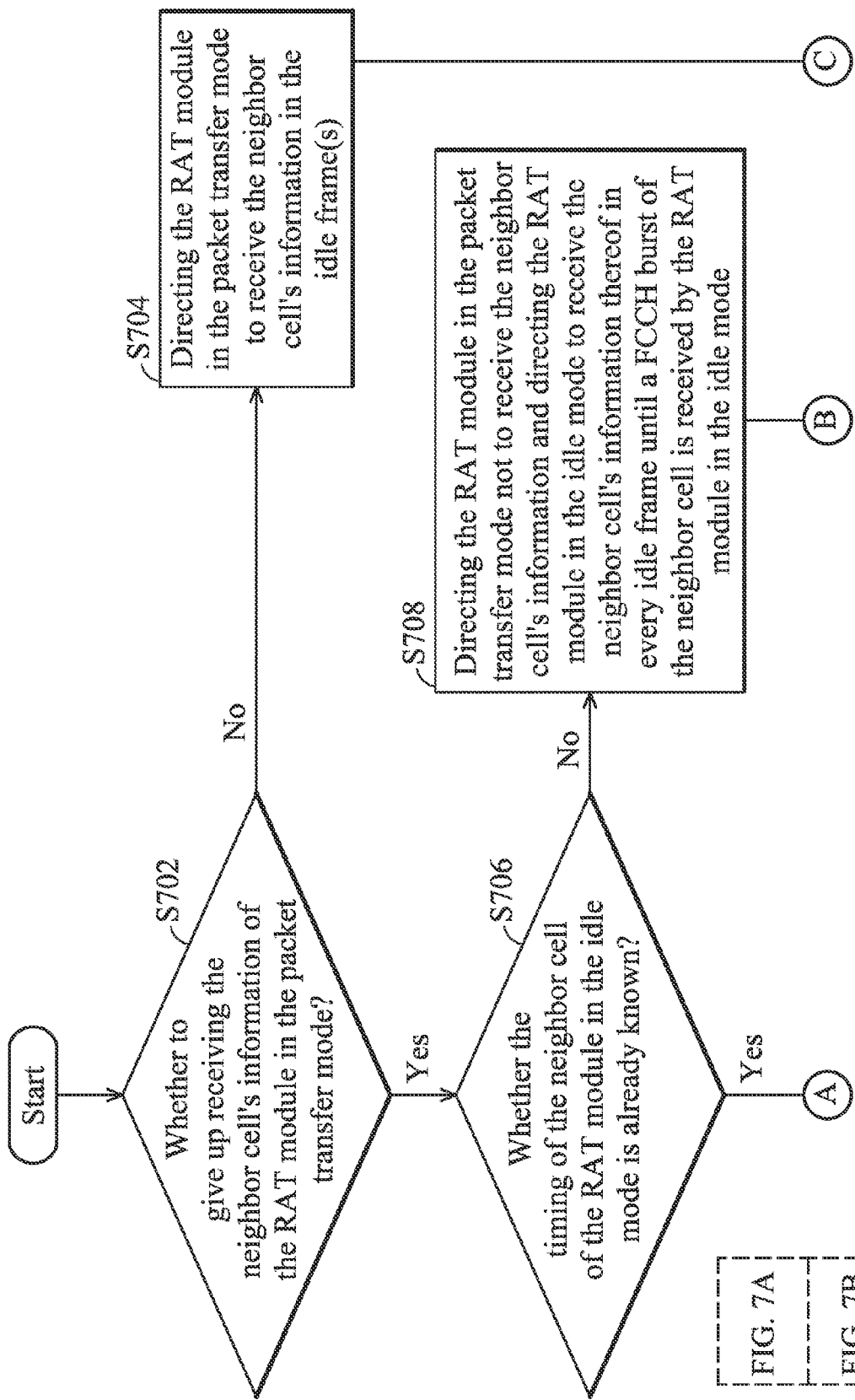
FIG. 7A and FIG. 7B show a flow chart of another method for scheduling radio activities for multiple RAT modules sharing one antenna in a communications apparatus in a coordinated manner according to another embodiment of the invention.
Figure 7B:
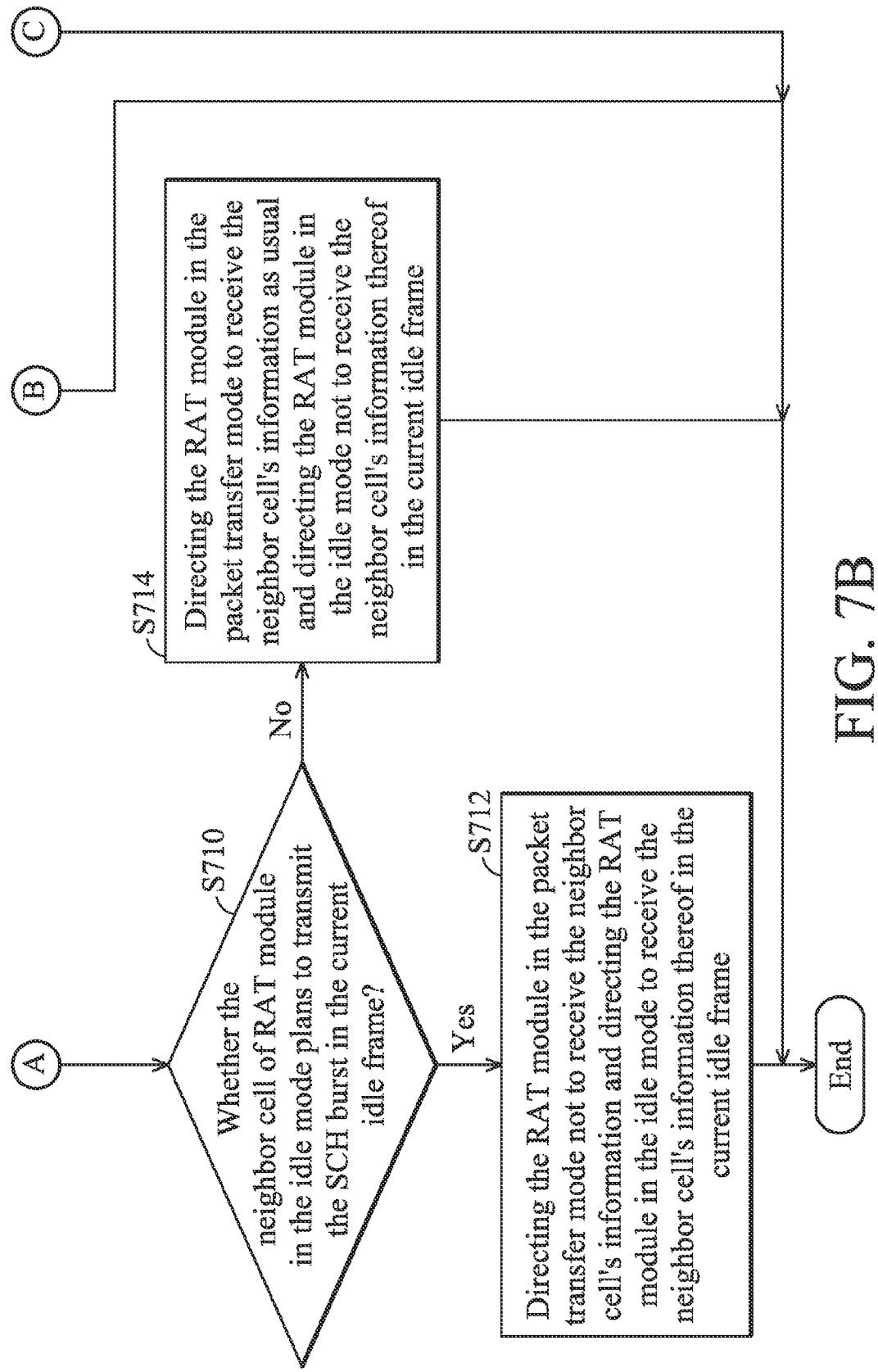

To further illustrate the concept, FIG. 7A and FIG. 7B show a flow chart of another method for scheduling radio activities for multiple RAT modules sharing one antenna in a communications apparatus in a coordinated manner according to another embodiment of the invention. The processor may first determine whether to give up receiving the neighbor cell's information of the RAT module in the packet transfer mode (Step S702). The determination may be made according to the corresponding priority as previously described. If not, the processor may direct the RAT module in the packet transfer mode to receive the neighbor cell's information in the idle frame(s) (Step S704). If the processor determines to give up receiving the neighbor cell's information of the RAT module in the packet transfer mode, the processor may further determine whether the timing (i.e. the frame structure) of the neighbor cell of the RAT module in the idle mode is known (Step S706).

If the timing of the neighbor cell is unknown, the processor may direct the RAT module in the packet transfer mode not to receive the neighbor cell's information and direct the RAT module in the idle mode to receive the neighbor cell's information thereof in every idle frame until a FCCH burst of the neighbor cell is received by the RAT module in the idle mode (Step S708). If the timing of the neighbor cell is known, the processor may further determine whether the neighbor cell of RAT module in the idle mode plans to transmit the SCH burst in the current (or a forthcoming) idle frame (Step S710). If so, the processor may direct the RAT module in the packet transfer mode not to receive the neighbor cell's information and direct the RAT module in the idle mode to receive the neighbor cell's information thereof in the current (or the forthcoming) idle frame (Step S712). Otherwise, the processor may direct the RAT module in the packet transfer mode to receive the neighbor cell's information as usual and direct the RAT module in the idle mode not to receive the neighbor cell's information thereof in the current (or the forthcoming) idle frame (Step S714). The receiving of the neighbor cell's information of the RAT module in the idle mode may be scheduled in another idle frame during the time when the neighbor cell transmits the SCH burst. Therefore, the amount of provided gap interval(s) and the operations of switching the shared radio resources between different RAT modules may be minimized.

Figure 8:
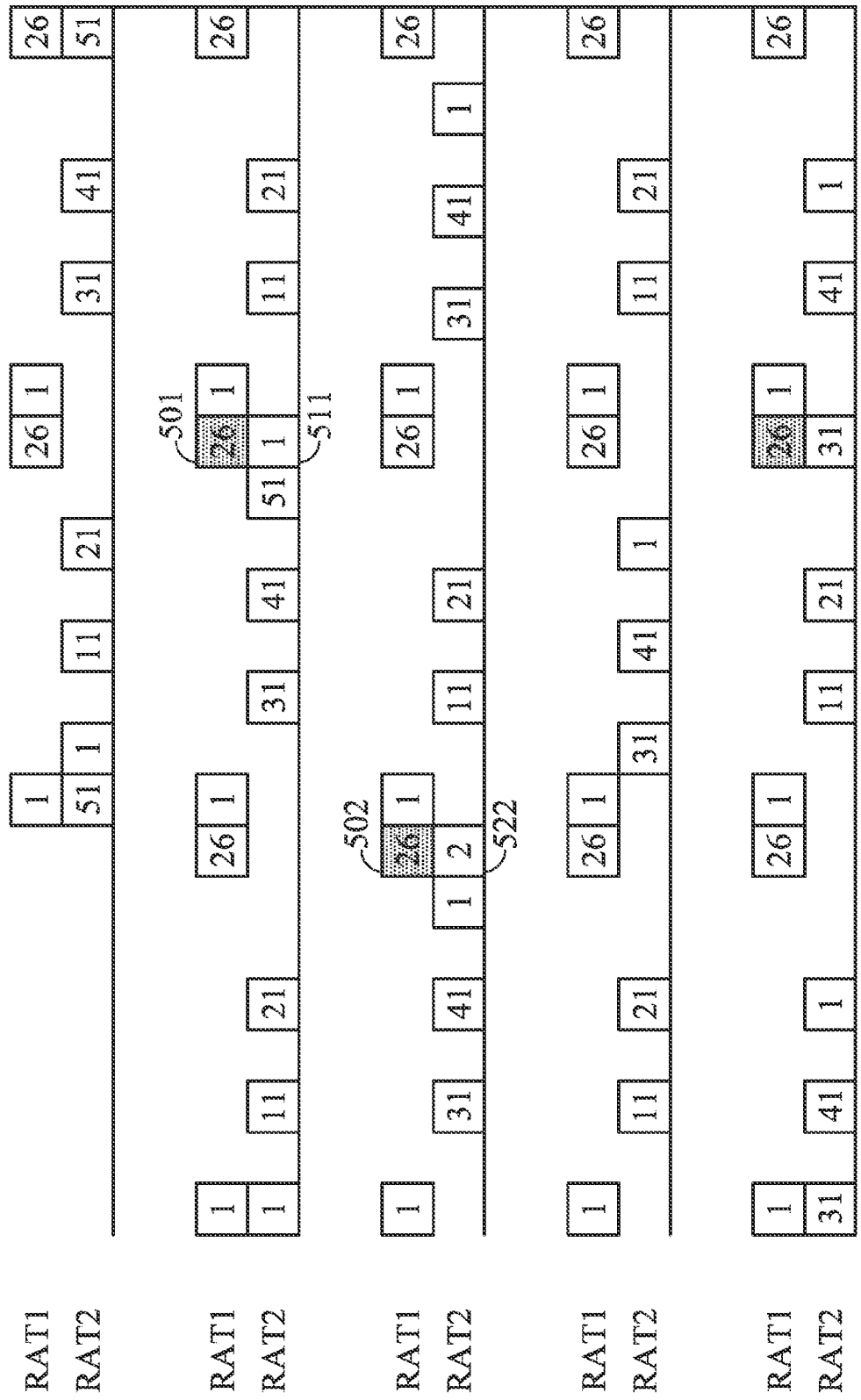
FIG. 8 is a schematic diagram showing the gap intervals provided by the RAT module in the packet transfer for the RAT module in the idle mode to receive the neighbor cell's information according to an embodiment of the invention.

FIG. 8 is a schematic diagram showing the gap intervals provided by the RAT module in the packet transfer for the RAT module in the idle mode to receive the neighbor cell's information according to an embodiment of the invention, where the digits in the figure represent the corresponding frame number of different RAT modules and the digits in the dotted block represent the gap interval provided by the RAT module RAT 1. According to the embodiment of the invention, because 26 (that is, the "26" of 26 muiltiframe) and 51 (that is, the "51" of 51 muiltiframe) are relatively prime, during the repetitions of the muiltiframes, the locations of FCCH and SCH of the 51 muiltiframe will eventually collide with the idle frame of the 26 multiframe. Therefore, as shown in FIG. 8, even if the timing of the neighbor cell of the RAT module in the idle mode (that is, the RAT 2) is unknown, the RAT module RAT 2 may eventually receive a FCCH burst in frame 511, where the idle frame 501 of the RAT module RAT 1 is provided here as a gap interval. Next, the RAT module RAT 2 may further receive an SCH burst in frame 522 and obtain the BSIC information carried therein, where the idle frame 502 of the RAT module RAT 1 is also provided here as a gap interval. If the timing of the neighbor cell of the RAT module RAT 2 is known, the processor may directly direct the RAT module RAT 2 to receive the SCH burst in frame 522. Therefore, the amount of provided gap interval(s) and the operations of switching the shared radio resources between different RAT modules may be minimized.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
a processor, coupled to a first radio access technology (RAT) module corresponding to a first subscriber identity card, a second RAT module corresponding to a second subscriber identity card and a radio transceiver shared by the first and second RAT modules,
wherein the first RAT module camps on a first serving cell belonging to a first wireless network and is in a packet transfer mode to perform data transfer in the first wireless network via the radio transceiver;
wherein the second RAT module camps on a second serving cell belonging to a second wireless network;
wherein the processor schedules the second RAT module to receive at least one neighbor cell's information of the second serving cell in a portion of a plurality of idle frames of the first RAT module during the data transfer of the first RAT module via the radio transceiver, and
wherein when a frame structure of the neighbor cell of the second RAT module is known, the processor schedules a portion of the idle frames, during a time when the neighbor cell of the second RAT module transmits a synchronization channel (SCH) burst, for the second RAT module to receive the neighbor cell's information via the radio transceiver.

2. The communication apparatus as claimed in claim 1, wherein the first RAT module is expected to receive at least one neighbor cell's information in the idle frames during the data transfer via the radio transceiver, and the processor determines to direct the first RAT module not to receive the neighbor cell's information and direct the second RAT module to receive the neighbor cell's information thereof in the portion of the idle frames.

3. The communication apparatus as claimed in claim 1, wherein at least one of the idle frames is an idle frame of a 26 multiframe.

4. The communication apparatus as claimed in claim 1, wherein the neighbor cell's information is a frequency correction channel (FCCH) burst or a synchronization channel (SCH) burst.

5. The communication apparatus as claimed in claim 1, wherein the neighbor cell's information is a base station identity code (BSIC) associated with the neighbor cell.

6. The communication apparatus as claimed in claim 2, wherein the processor determines to direct the first RAT module not to receive the neighbor cell's information and direct the second RAT module to receive the neighbor cell's information thereof when priority of receiving the neighbor cell's information of the second RAT module is higher than priority of receiving the neighbor cell's information of the first RAT module.

7. The communication apparatus as claimed in claim 2, wherein when priority of receiving the neighbor cell's information of the first RAT module is equal to priority of receiving the neighbor cell's information of the second RAT module, the processor schedules the first RAT module and the second RAT module to receive the corresponding neighbor cell's information in the idle frames in a round-robin manner.

8. The communication apparatus as claimed in claim 3, wherein when a frame structure of the neighbor cell of the second RAT module is unknown, the processor schedules all of the idle frames for the second RAT module to receive the neighbor cell's information via the radio transceiver until a frequency correction channel (FCCH) burst of the neighbor cell is received.

9. A method for scheduling radio activities for at least a first radio access technology (RAT) module and a second RAT module configured in a communications apparatus and sharing a radio transceiver, wherein the first RAT module camps on a first cell belonging to a first wireless network and is in a packet transfer mode to perform data transfer in the first wireless network via the radio transceiver and the second RAT module camps on a second cell belonging to a second wireless network, the method comprising:

directing the first RAT module not to receive at least one neighbor cell's information of the first serving cell in a portion of a plurality of idle frames during the data transfer, wherein in the idle frames, the first RAT module is expected to receive the neighbor cell's information of the first serving cell via the radio transceiver; and directing the second RAT module to receive at least one neighbor cell's information of the second serving cell in the portion of the idle frames via the radio transceiver, wherein when a frame structure of the neighbor cell of the second RAT module is known, the method further comprises:

directing the first RAT module not to receive the neighbor cell's information and directing the second RAT module to receive the neighbor cell's information in a portion of the idle frames, during a time when the neighbor cell of the second RAT module transmits a synchronization channel (SCH) burst, via the radio transceiver.

10. The method as claimed in claim 9, wherein at least one of the idle frames is an idle frame of a 26 multiframe.

11. The method as claimed in claim 9, wherein the neighbor cell's information to be received by the second RAT module is a frequency correction channel (FCCH) burst or a synchronization channel (SCH) burst.

12. The method as claimed in claim 9, wherein the neighbor cell's information to be received by the second RAT module is a base station identity code (BSIC) associated with the neighbor cell.

13. The method as claimed in claim 9, further comprising:

comparing priority of receiving the neighbor cell's information of the first RAT module and priority of receiving the neighbor cell's information of the second RAT module for the idle frames; and directing the first RAT module not to receive the neighbor cell's information and directing the second RAT module to receive the neighbor cell's information thereof in the portion of the idle frames when the priority of receiving the neighbor cell's information of the second RAT module is higher than the priority of receiving the neighbor cell's information of the first RAT module.

14. The method as claimed in claim 9, further comprising:

comparing priority of receiving the neighbor cell's information of the first RAT module and priority of receiving the neighbor cell's information of the second RAT module for the idle frames; and directing the first RAT module and the second RAT module to receive the corresponding neighbor cell's information in the idle frames in a round-robin manner when the priority of receiving the neighbor cell's information of the first RAT module is equal to the priority of receiving the neighbor cell's information of the second RAT module.

15. The method as claimed in claim 10, wherein when a frame structure of the neighbor cell of the second RAT module is unknown, the method further comprises:

directing the first RAT module not to receive the neighbor cell's information and directing the second RAT module to receive the neighbor cell's information thereof in every idle frame via the radio transceiver until a frequency correction channel (FCCH) burst of the neighbor cell is received by the second RAT module.

* * * * *